United States Patent Office 3,400,085
Patented Sept. 3, 1968

3,400,085
HIGH DENSITY POLYURETHANE FOAMS
Francis M. Kujawa, Tonawanda, and Blaine O. Schoepfle, Snyder, N.Y., assignors to Hooker Chemical Corporation, Niagara Falls, N.Y., a corporation of New York
No Drawing. Continuation-in-part of application Ser. No. 348,776, Mar. 2, 1964. This application May 18, 1966, Ser. No. 550,917
17 Claims. (Cl. 260—2.5)

ABSTRACT OF THE DISCLOSURE

A composition suitable for use in preparing a polyurethane foam having a density of at least 4 pounds per cubic foot is prepared by mixing a hydroxyl-containing polymer having a hydroxyl number between about 25 to 900, and a secondary phophonate that is non-reactive in the urethane reaction. Such compositions are reacted with a polyarylpolyisocyanate, in the presence of a foaming agent to produce a polyurethane foam having a uniform cell structure.

---

This is a continuation-in-part of Ser. No. 348,776, filed Mar. 2, 1964, now abandoned, which is a continuation-in-part of Ser. No. 248,275, filed Dec. 31, 1962, now Patent No. 3,257,337.

This invention relates to polyurethane compositions that are particularly suitable for use in the production of higher density foam products. In another aspect, it relates to a process for improving the compatibility and mixing characteristics of components in a polyurethane foamable composition.

Particularly desirable polyurethane foams are produced by reacting a hydroxyl-containing polymer with a polyarylpolyisocyanate in the presence of a foaming agent, and optionally a catalyst. The production of higher density foams—4 pounds per cubic foot and higher—in relatively thick sections, 2 inches in thickness or greater, requires foamable compositions having relatively lower activity than compositions used for producing the more usual 2 pound per cubic foot density foams. The lower reaction rates prevent too rapid a build-up of heat due to the heat of reaction of the components. However, especially with the polyurethane foams made with polyarylpolyisocyanates, the lower reaction rates also tend to provide more time for the components to separate or stratify during the course of the reaction process. This phenomenon leads to non-uniform distribution of components, and to non-uniform foam structures in the final foam products.

Accordingly, it is an object of this invention to provide a polyurethane composition particularly suitable for the production of higher density foams. Another object of the invention is to provide a method for effectively preventing the stratification or separation of the components of a foamable composition containing a polyarylpolyisocyanate during the reaction process. A further object is to improve the compatibility and mixing characteristics of the components of such a foamable composition. These and other objects of the invention will become more apparent upon consideration of the following detailed specification.

The objects of the invention are accomplished by the method of incorporating in the foamable composition a second degree ester of phosphonic acid (secondary phosphonate) that is non-reactive in the urethane reaction. Thus, in accordance with this invention there are provided polyurethane compositions having incorporated therein a phosphorus compound having the formula:

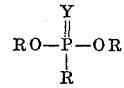

wherein Y is oxygen or sulfur, and R is selected from the group consisting of alkyl, halogen substituted alkyl, aralkyl and aryl radicals that are not substituted by radicals that are reactive in the urethane reaction. The hydrocarbon radicals preferably contain from 1 to 20 carbon atoms, more preferably from 1 to 10 carbon atoms. The alkyl groups can be substituted with one or more of the same halogen atoms, such as chlorine or bromine, or with the mixture of halogen atoms, such as a mixture of chlorine or bromine atoms.

More particularly, the polyurethane composition of the invention comprises (A) a hydroxyl-containing polymeric material having a hydroxyl number between about 25 and 900, (B) a second degree ester of phosphonic acid of the type described in the preceding paragraph, (C) a polyarylpolyisocyanate, and (D) a foaming agent. Optionally, catalysts and other additives can be used in the compositions. Particularly suitable for use as the hydroxyl-containing polymer of this invention are the alkyd resins containing an adduct of hexahalocyclopentadiene.

Suitable second degree esters of phosphonic acid that can be used in the practice of the invention include dimethyl methylphosphonate, diethyl methylphosphonate, diethyl methylphosphonate, diethyl amylphosphonate, diamyl amylphosphonate, dilauryl methylphosphonate, diphenyl methylphosphonate, dibenzyl methylphosphonate, diphenyl cresylphosphonate, dimethyl cresylphosphonate, bis(chloropropyl) chloropropylphosphonate, bis(chloropropyl) propenyl-2-phosphonate, bis(2,3-dibromopropyl) 2,3-dibromoproyl phosphonate, and bis(betachloroethyl) vinyl phosphonate; and the corresponding sufur analogs such as dimethyl methylthionophosphonate, diamyl amylthionophosphonate and the like.

In the preparation of the polyurethane compositions of the invention, it is preferred to use a hydroxyl-containing polymeric material having a hydroxyl number between about 25 and 900. Such a polymeric material can be a polyester, a polyether or mixtures thereof. Generally, the hydroxyl-containing polymers of the invention have a molecular weight in the range from 200 to about 4,000.

Rigid or flexible polyurethane foams are produced in accordance with this invention. The rigid polyurethane foams utilize highly branched hydroxyl rich polyesters or polyethers having a hydroxyl number of between about 200 and 900. The flexible polyurethane foams utilize linear, relatively hydroxyl-poor polyesters or polyethers having hydroxyl number of between about 25 and 100. If a polyester or polyether with a hydroxyl number between about 100 and 200 is employed, a semi-rigid polyurethane foam is usually obtained.

The polyesters are the reaction products of a polyhydric alcohol and a polycarboxylic compound, said polycarboxylic compound being either a polycarboxylic acid, a polycarboxylic acid anhydride, a polycarboxylic acid ester, a polycarboxylic acid halide or mixtures thereof. The carboxylic compounds can be aliphatic, cycloaliphatic, aromatic, or heterocyclic and either saturated or unsaturated. Among the polycarboxylic compounds which can be used to form the polyester are: maleic acid; fumaric acid;

phthalic acid; isophthalic acid; terephthalic acid; tetrachlorophthalic acid; aliphatic acids such as oxalic, malonic, succinic, glutaric and adipic; 1,4-cyclo-hexadiene-1,2-dicarboxylic acid and the like. Additional polycarboxylic compounds which can be used to form the polyester are Diels-Alder adducts of hexahalocyclopentadiene and a polycarboxylic compound containing aliphatic carbon-to-carbon unsaturation, wherein the halogen is selected from the group consisting of chlorine, bromine, fluorine and mixtures thereof, for example: 1,4,5,6,7,7-hexachlorobicyclo-(2.2.1)-5-heptene-2,3-dicarboxylic acid; 1,4,5,6-tetrachloro-7,7-difluorobicyclo-(2.2.1)-5-heptene-2,3 - dicarboxylic acid: 1,4,5,6,7,7-hexabromobicyclo - (2.2.1) - 5-heptene-2,3-dicarboxylic acid; 1,4,5,6-tetrabromo-7,7 - difluorobicyclo-(2.2.1)-5-heptene-2,3-dicarboxylic acid; and the corresponding acid anhydrides, acid halides, and acid esters. Mixtures of any of the above polycarboxylic compounds can be employed.

At least a portion of the total polyhydric alcohol component should comprise a polyhydric alcohol containing at least three hydroxyl groups. Where a very rigid structure is desired, the entire alcohol component can comprise a trifunctional alcohol such as glycerol. Where a less rigid foam product is desired, a difunctional polyhydric alcohol such as ethylene glycol or 1,4-butanediol can be utilized as part of the polyhydric alcohol component. Suitable polyfunctional alcohols include diethylene glycol, propylene glycol, polypropylene glycols, polybutylene glycols, glycerol, hexanetriol, trimethylol propane, trimethylol ethane, mannitol, cyclohexanediol-1,4; glycerol monoethyl ether and the like. The ratio of the polyhydric alcohol such as glycerol to the polybasic acid can be expressed as the hydroxyl-carboxyl ratio, which can be defined as the number of moles of hydroxyl groups to the number of moles of carboxyl groups in a given weight of resin. This ratio can be varied over a wide range. Generally, however, a hydroxyl-carboxyl ratio of between 1.5:1 to 5:1 is needed.

Instead of employing a polycarboxylic compound which is Diels-Alder adduct of hexahalocyclopentadiene and a polycarboxylic compound, a polyhydric alcohol which is a Diels-Alder adduct of hexahalocyclopentadiene and a polyhydric alcohol can be used. This is done by employing (A) a polyester resin comprised of the reaction products of (1) an adduct of hexahalocyclopentadiene and a polyhydric alcohol containing aliphatic carbon-to-carbon unsaturation, (2) a polycarboxylic compound and (3) a polyhydric alcohol containing at least three hydroxyl groups. Typical adducts include: 2,3-dimethylol-1,4,5,6,7,7-hexachlorobicyclo-(2.2.1)-5-heptene; 2,3-dimethylol - 1, 4,5,6-tetrachloro-7,7-difluorobicyclo-(2.2.1) - 5 - heptene; and the like.

The preferred polyesters of the invention are those which contain an adduct of hexahalocyclopentadiene co-reacted in the polyester portion in view of the fact that they contain a large amount of stable halogen, thereby enhancing the flame-retardant characteristics of the resultant foam. Particularly preferred are those polyesters wherein the adduct is reacted in the polycarboxylic portion of the polyester, due to lower cost and commercial availability of the polycarboxylic adducts of hexahalocyclopentadiene.

A particularly desirable alkyd resin for use in this invention is prepared by reacting a polycarboxylic compound and a polyhydric alcohol, at least one of which is an adduct of hexahalocyclopentadiene as defined hereinbefore, in a ratio to provide more than one hydroxyl group for each carboxyl group. The reaction of the components is continued until a resin is produced having an acid number in the range of 20 to 90, preferably 25 to 60. Then an epoxide is introduced to the reaction mixture and the reaction is continued until the resin has an acid number of less than 20, preferably less than 10 and still more preferably less than about 2. The preferred reaction temperature is in the range of 150 to 200 degrees centigrade, but higher and lower temperatures can be employed. The hydroxyl number of the resulting resin generally is in the range of about 200 to 800, usually from about 300 to 600. The monomeric epoxides are generally preferred in preparing the composition, and typical examples of these are ethylene oxide, propylene oxide, butylene oxide, cyclohexene oxide, styrene oxide, allyl glycidyl ethers, glycidyl sorbate, and the like. The preferred compounds are alkylene oxides having up to 6 carbon atoms.

The polyethers employed are known in the art, and are the reaction products of (1) either a polyhydric alcohol, a polycarboxylic acid or a polyphenolic compound, and (2) a monomeric 1,2-epoxide possessing a single 1,2-epoxy group, such as, for example, propylene oxide. The polyhydric alcohols and polycarboxylic acids which can be employed are any of the polyhydric alcohols and polycarboxylic acids listed hereinbefore. Polyphenolic compounds which can be employed are the reaction products of phenolic compounds with aldehydes, such as phenolformaldehyde novolac resins. Examples of monomeric 1,2-epoxides include ethylene oxide, propylene oxide, butylene oxide, styrene oxide, cyclohexene oxide, allyl glycidyl ether, butyl glycidyl sulfide, glycidyl sorbate, glycidyl allyl phthalate, and the like. The preferred monoepoxides are the monoepoxide substituted hydrocarbons, the mono-epoxy-substituted ethers, sulfides, sulfones and esters wherein the said compounds contain no more than eighteen carbon atoms. A lower alkylene oxide having up to 6 carbon atoms, is preferably employed in rigid foams as the higher counterparts yield flexible rather than rigid products.

Various polyarylpolyisocyanates which contain an average of at least three arylene radicals per molecule can be used in preparing the compositions of the invention. Especially preferred for use in the invention are the polyarylpolyisocyanates having the following generalized formula:

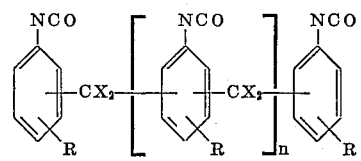

wherein R is selected from the group consisting of hydrogen, chlorine, bromine, alkyl having 1 to 5 carbon atoms, and alkoxy having 1 to 5 carbon atoms; X is selected from the group consisting of hydrogen, alkyl having 1 to 10 carbon atoms and phenyl; and $n$ has an average value of at least 1 and generally about 1 to 3. The preferred composition of this type is polymethylene polyphenylisocyanate which is a mixture of compounds having the following generalized formula:

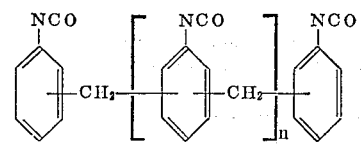

wherein $n$ has an average value of at least 1 and generally is from 1 to 3. Other typical compounds of this type include those wherein the R groups are chlorine, bromine, methyl or methoxy, and wherein the value of X is methyl or phenyl in the generic formula.

Also useful are polyarylpolyisocyanates having the following formula:

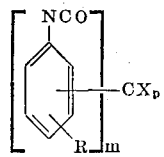

wherein R and X are as defined hereinbefore, m is a number from 3 to 4, p is a number from 0 to 1 and m+p is 4.

Typical compounds have the formulae:

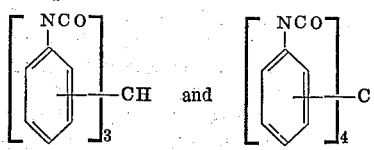

Mixtures of the compounds are also useful.

Any foaming agent commonly used in the art can be employed. These are generally those materials that are capable of liberating gaseous products when heated, or when reacted with an isocyanate. Preferably, foaming is accomplished by introducing a low boiling liquid into the resin. The heat of reaction is then sufficient to expand the mixture to a foam stable enough to retain its shape until the resin gels. Suitable liquids are the fluorochlorocarbons boiling in the range of −30 to 50 degrees centigrade and mixtures thereof, for example, trichlorofluoromethane, trichlorotrifluoroethane, difluoromonochloroethane, and difluorodichloroethane. Also useful are mixtures of the fluorocarbons with chlorocarbons such as methylene chloride. Another class of foaming agents that is suitable for carrying out the foaming reaction at an elevated temperature is a tertiary alcohol in combination with a strong concentrated acid catalyst. Examples of tertiary alcohols include: tertiary amyl alcohol; tertiary butyl alcohol; and the like. Examples of catalysts include sulfuric acid and aluminum chloride. Other foaming agents that can be used include the following: polycarboxylic acids, polycarboxylic acid anhydrides, dimethylol ureas, polymethylol phenols, formic acid and tetrahydroxy methyl-phosphonium chloride.

If desired, a reaction catalyst can be employed in preparing the composition of the invention. Generally, but not necessarily, catalysts are employed to prepare the polyurethane foams having densities up to about 6 pounds per cubic foot. For foam products having densities of 6 pounds per cubic foot and higher, reaction catalysts are generally not needed. The catalysts employed can be any of the known conventional catalysts for isocyanate reactions, but the tertiary amines are preferred. Many such compounds are useful in the reaction, but they generally have up to 20 carbon atoms. Typical compounds of the trialkyl amines, such as trimethyl amine, triethyl amine, diethylene triamine, tetramethyl butane diamine and the like. Also suitable are the morpholine compounds such as N-methyl morpholine, N-acetyl morpholine, 4,4′-dithio morpholine, and the like, and the tertiary amine compounds have other functional groups such as diethyl ethanol amine, methyl diethanol amine, N-diethyl aminoacetic acid, methyl aminodipropionic acid, N-methyl dipropylene triamine, dimethyl piperazine, and the like. The preferred amine compounds are triethyl amine and tetramethyl guanidine. Other urethane catalysts are also useful, for example: the antimony compounds, such as antimony caprylate, antimony naphthenate, and antimonious chloride; the tin compounds such as dibutyltin dilaurate, tri-n-octyltin oxide, hexabutylditin, tributyltin phosphate or stannic chloride.

In preparing the polyurethane compositions of this invention, the hydroxyl-containing polymer and polyisocyanate are preferably reacted in a ratio sufficient to provide about 85 to 115 percent of isocyanato groups with respect to the total number of hydroxyl and carboxyl groups present in the hydroxyl-containing polymeric material (and the foaming agent, if one is provided). The organic phosphonates of the invention are employed in an amount of at least about 1 part, up to about 20 parts by weight per hundred parts of the hydroxyl-containing polymer. The preferred amount of the organic phosphonate is from about 2 to about 10 parts by weight per one hundred parts of hydroxyl-containing polymer. It is generally preferred to add the phosphorus compound directly to the hydroxyl-containing polymer to reduce the viscosity, and subsequently to add polyisocyanate and the foaming agent; however excellent results are obtained when all the components are simultaneously put together. The foaming agent is preferably employed in an amount sufficient to produce a foam having a density in the range of about 4 to 30 pounds per cubic foot, preferably 4 to 20 pounds per cubic foot. The reaction temperature generally ranges from about 20 to about 120 degrees centigrade, although higher and lower temperatures can be employed. The temperatures of the components can be adjusted to provide a foamable composition in a pre-expanded or frothed condition, if desired.

Various additives can be incorporated in the polyurethane composition to modify the properties thereof. For example, the fire resistance of the composition can be further improved by the addition of an antimony compound. Fillers, such as clay, calcium sulfate or ammonium phosphate can be added to lower the cost; components, such as dyes can be added for color, and fibrous glass, asbestos, synthetic fibers can be added to improve strength characteristics. Surfactants are generally employed to control cell structure. Suitable cell controllers are the silicone-glycol copolymers, such as triethoxy dimethyl polysiloxane copolymerized with a dimethoxypolyethylene glycol.

The compositions of the invention are useful in a variety of applications. For example, the foams having a density in the range of about 4 to 6 pounds per cubic foot are useful in constructing special protective panels requiring extra strength. The foams having a density in the range of about 4 to 10 pounds per cubic foot are particularly suited for use in the construction of radomes. The higher density foams, such as those having densities in the range of 15 to 25 pounds per cubic foot are useful in applications requiring extra strength such as floor bedding for refrigerator cars, foam-filled panels for use in marine construction, and the like.

The following examples serve to illustrate the invention, but are not intended to limit. All parts are by weight and temperatures are in degrees centigrade, unless it is indicated otherwise.

EXAMPLE 1

A mixture of hydroxyl-containing polymers was prepared by blending the following components: 50 parts of a polyester containing 2 moles of trimethylol propane to 1 mole of 1,4,5,6,7,7-hexachlorobicyclo-(2.2.1)-5-heptene-2,3-dicarboxylic anhydride, and having a hydroxyl number of about 370; and 50 parts of a polyethylene ether polyol having a hydroxyl number of about 300, and 2.7 parts of trimethylol propane. To 200 parts of the foregoing composition were added 162 parts of polymethylene polyphenylisocyanate, about one part of a silicone-glycol copolymer [1] cell controller and 21.8 parts of trichlorofluoromethane. The mixture was agitated vigorously at 50 degrees centigrade for 15 seconds and poured into a mold. After the resulting foam was cured, it was cut into sections. The interior of the foam was observed to have a very non-uniform cell structure—areas of coarse cells, areas of fine cells—across a given cross-section of foam. Some areas of the foam were cracked. The overall density of the foam was 4.1 pounds per cubic foot.

EXAMPLES 2, 3, AND 4

In these examples, various quantities of dimethyl methyl phosphonate were incorporated into the mixture of hydroxyl-containing polymer. The mixtures were then used to make polyurethane foams in accordance with the procedure of Example 1. The quantity of foaming agent was increased to maintain a constant ratio in the total ---
[1] A polysiloxane-polyoxyalkylene block copolymer prepared in accordance with the disclosure in U.S. Patent No. 2,834,748.

composition. The resulting foams had properties shown in Table 1.

TABLE 1

| Ex. | P Dehosphonate, parts per 100 parts resin | Foaming agent, parts per 100 parts resin | Density, pounds per cubic foot | Quality of Foam |
|---|---|---|---|---|
| 1 | 0 | 10.9 | 4.1 | Very non-uniform cell structure, some cracks. |
| 2 | 1 | 10.8 | 4.0 | Non-uniform cell structure, no cracking. |
| 3 | 2 | 10.7 | 4.0 | Minor variation in cell structure, no cracking. |
| 4 | 5 | 10.5 | 4.2 | Uniform, fine cell structure, no cracking. |

EXAMPLES 5, 6, AND 7

In these examples, a mixture of hydroxyl-containing polymers was prepared by blending 50 parts of polyester containing 2 moles of trimethylol propane to 1 mole of 1,4,5,6,7,7-hexachloro-(2.2.1)-5-heptene-2,3 - dicarboxylic anhydride and having a hydroxyl number of about 370; and 50 parts of a polyethylene ether polyol having a hydroxyl number of about 300, 2.7 parts of trimethylol propane and 5.4 parts of diamyl amylphosphonate. To 100 parts of the foregoing composition were added 84 parts of polymethylene polyphenylisocyanate, 1.75 parts of a silicone-glycol copolymer [2] cell controller, and various amounts of trichlorofluoromethane suitable for producing foams of several densities as follows:

| Ex. | Density, pounds per cubic foot | Foaming agent, parts per 100 parts resin | Polyol temperature, °F. | Isocyanate temperature, °F. |
|---|---|---|---|---|
| 5 | 21.8 | 1 | 112 | 92 |
| 6 | 14.6 | 4 | 103 | 76 |
| 7 | 7.8 | 9 | 103 | 76 |

The mixtures of components were agitated vigorously and poured into molds. The resulting foams had properties shown in Table 2. In this table comparison is also made with commercial foams having densities comparable to the foam produced in Example 7.

TABLE 2

| | Example No. | | | Commercial foam A | Commercial foam B |
|---|---|---|---|---|---|
| | 5 | 6 | 7 | | |
| Density, pounds per cubic foot | 21.8 | 14.6 | 7.8 | 5.9 | 6.5 |
| Compressive strength, pounds per square inch: Parallel at— | | | | | |
| 25° C | 1,370 | 617 | 216 | 178 | 150 |
| 80° C | 950 | 465 | 155 | 139 | 100 |
| 100° C | 790 | 405 | 143 | 108 | 85 |
| 120° C | 620 | 310 | 100 | | |
| Perpendicular at 25° C | 1,280 | 603 | 200 | 119 | 160 |
| Compression strength retention, percent: | | | | | |
| 80° C | 69 | 75.4 | 71.8 | 78 | 67 |
| 100° C | 58 | 65.6 | 66.2 | 61 | 57 |
| 120° C | 45 | 50.2 | 46.1 | | |
| Fire resistance: ASTM D-757-49, inches per minute | 0.6 | 0.66 | 0.86 | | |
| ASTM D-1692-59T, classification | (¹) | (¹) | (¹) | | |

[1] Non-burning.

Following the procedure of Examples 5–7, similar results are obtained for the following phosphorus compounds.

Example 8—Bis(chloropropyl) chloropropylphosphonate
Example 9—Dimethyl methylthionophosphonate The foregoing examples show the improved results that can be obtained by using the compositions of this invention. These results are due in large measure to the improvement in the compatibility of the various components of the foamable composition, the polyol, the polyisocyanate and the foaming agent, as a result of incorporating an organic phosphonate therein. Other advantages that have been observed are the reduction in the viscosity of the hydroxyl-containing polymers that result from incorporating the organic phosphonate therein, as well as overall improvements in the fire resistance of the polyurethane foams containing the organic phosphonates.

While the invention has been described with reference to certain specific embodiments, it will be recognized by those skilled in the art that many variations are possible without departing from the spirit and scope of the invention.

We claim:
1. A polyurethane foamed composition having a density of at least four pounds per cubic foot, and comprising the reaction product of components comprising:
  (A) a hydroxyl-containing polymer having a hydroxyl number of about 25 to 900,
  (B) as the sole phosphorus containing component, a compound having the formula:

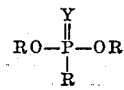

wherein Y is selected from the group consisting of oxygen and sulfur, and R is selected from the group consisting of alkyl, halogen-substituted alkyl, aralkyl, alkaryl and aryl, in a proportion of about 1 to about 20 parts by weight per hundred parts of the hydroxyl-containing polymer;
  (C) a polyarylpolyisocyanate having the formula:

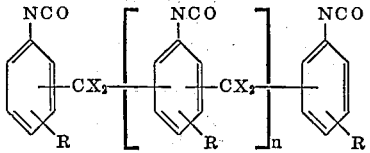

wherein R is selected from the group consisting of hydrogen, chlorine, bromine, alkyl having 1 to 5 carbon atoms, and alkoxy having 1 to 5 carbon atoms; X is selected from the group consisting of hydrogen, alkyl having 1 to 10 carbon atoms and phenyl; and $n$ has an average value of about 1 to 3; and
  (D) a foaming agent.
2. The polyurethane foam of claim 1 wherein the phosphorus compound is diamyl amylphosphonate.
3. The polyurethane foam of claim 1 wherein the phosphorus compound is dimethyl methylphosphonate.
4. The polyurethane foam of claim 1 wherein the phosphorus compound is bis(chloropropyl) chloropropylphosphonate.
5. The polyurethane foam of claim 1 wherein the polyarylpolyisocyanate is polymethylene polyphenylisocyanate.
6. The foamed composition of claim 1 wherein the hy-

---

[2] A polysiloxane-polyoxyalkylene block copolymer prepared in accordance with the disclosure in U.S. Patent No. 2,834,748.

droxyl-containing polymer comprises a polyester resin comprised of the reaction product of a polyhydric alcohol and a polycarboxylic compound.

7. The foamed composition of claim 1 wherein the hydroxyl-containing polymer is a mixture of a polyester comprised of the reaction product of a polyhydric alcohol and polycarboxylic compound, and a polyether comprised of the reaction product of a monomeric 1,2-epoxide and a material selected from the group consisting of a polyhydric alcohol, a polycarboxylic acid and a polyphenolic compound.

8. The foamed composition of claim 6 wherein the polycarboxylic portion of said polyester contains an adduct of hexahalocyclopentadiene and a polycarboxylic compound, wherein the halogen is selected from the group consisting of fluorine, chlorine, bromine and mixtures thereof.

9. The foamed composition of claim 1 wherein the hydroxyl-containing polymer comprises an alkyl resin prepared by reacting a monomeric monoepoxide with the reaction product of (a) an adduct of hexachlorocyclopentadiene and a polycarboxylic compound containing aliphatic carbon-to-carbon unsaturation, and (b) a polyhydric alcohol containing three hydroxyl groups, said reaction product having an acid number in the range of 20 to 90; to produce a product having an acid number of less than 20.

10. A composition suitable for use in preparing a polyurethane foam having a density of four pounds per cubic foot which comprises the components:
    (A) a hydroxyl-containing polymer having a hydroxyl number of about 25 to 900;
    (B) as the sole phosphorus containing component, a compound having the formula:

$$RO-\underset{\underset{R}{|}}{\overset{\overset{Y}{\|}}{P}}-OR$$

wherein Y is selected from the group consisting of oxygen and sulfur, and R is selected from the group consisting of alkyl, halogen-substituted alkyl, aralkyl, alkaryl, and aryl, in a proportion of about 1 to about 20 parts by weight per hundred parts of the hydroxyl-containing polymer.

11. The composition of claim 10 wherein the hydroxyl-containing polymer comprises a polyester of components comprising a polyhydric alcohol and an adduct of hexahalocyclopentadiene and a polycarboxylic compound, wherein the halogen is selected from the group consisting of fluorine, chlorine, bromine and mixtures thereof, and the phosphorus compound has the formula:

$$RO-\underset{\underset{R}{|}}{\overset{\overset{O}{\|}}{P}}-OR$$

wherein R is alkyl.

12. The composition of claim 10 wherein the hydroxyl-containing polymer comprises a polyester of components comprising a polyhydric alcohol and an adduct of hexahalocyclopentadiene and a polycarboxylic compound, wherein the halogen is selected from the group consisting of fluorine, chlorine, bromine and mixtures thereof, and the phosphorus compound has the formula:

$$RO-\underset{\underset{R}{|}}{\overset{\overset{O}{\|}}{P}}-OR$$

wherein R is halogen-substituted alkyl.

13. A method for preparing a polyurethane foam of improved cell structure, which has a density of at least four pounds per cubic foot, which comprises reacting a composition comprised of:
    (A) a hydroxyl-containing polymer having a hydroxyl number of about 25 to 900, and
    (B) as the sole phosphorus containing component, a compound having the formula:

$$RO-\underset{\underset{R}{|}}{\overset{\overset{Y}{\|}}{P}}-OR$$

wherein Y is selected from the group consisting of oxygen and sulfur, and R is selected from the group consisting of alkyl, halogen-substituted alkyl, aralkyl, alkaryl and aryl, the phosphorus compound being present in said composition in a proportion of about 1 to about 20 parts by weight per hundred parts of the hydroxyl-containing polymer, with a polyaryl polyisocyanate having the formula:

wherein R is selected from the group consisting of hydrogen, chlorine, bromine, alkyl having 1 to 5 carbon atoms, and alkoxy having 1 to 5 carbon atoms; X is selected from the group consisting of hydrogen, alkyl, having 1 to 10 carbon atoms and phenyl; and $n$ has an average value of about 1 to 3, in the presence of a foaming agent.

14. The process of claim 13 wherein the phosphorus compound is diamyl amylphosphonate.

15. The process of claim 13 wherein the phosphorus compound is dimethyl methylphosphonate.

16. The process of claim 13 wherein the phosphorus compound is bis(chloropropyl) chloropropylphosphate.

17. The process of claim 13 wherein the polyarylpolyisocyanate is polymethylene polyphenylisocyanate.

References Cited

UNITED STATES PATENTS

| | | | |
|---|---|---|---|
| 3,156,659 | 11/1964 | Robitschek | 260—2.5 |
| 3,203,931 | 8/1965 | Swart | 260—77.5 |
| 3,250,827 | 5/1966 | Schroll | 260—2.5 |
| 3,257,337 | 6/1966 | Schoepfle | 260—2.5 |

FOREIGN PATENTS 1,297,489  5/1962  France.

OTHER REFERENCES

Carwin Co. Technical Bulletin, "Papi Derived Rigid Urethane Foams," February 1962, 11 pages.

DONALD E. CZAJA, *Primary Examiner.*

M. B. FEIN, *Assistant Examiner.*